United States Patent Office 3,833,558
Patented Sept. 3, 1974

3,833,558
PRODUCTION OF AMPICILLIN
Jinnosuke Abe, Shizuoka-ken, Tetsuo Watanabe, Yokohama, and Teruo Take, Kentaro Fujimoto, Tadashiro Fujii, Yasue Hotta, Sadami Kobari, Fumihiro Ishimura, Nobuya Kitahora, and Mituru Fukushima, Shizuoka-ken, Japan, assignors to Toyo Jozo Kabushiki Kaisha, Shizuoka, Japan
No Drawing. Filed Mar. 1, 1971, Ser. No. 119,844
Int. Cl. C07d 99/16
U.S. Cl. 260—239.1                            1 Claim

ABSTRACT OF THE DISCLOSURE

A chemical process for the production of ampicillin and nontoxic salts thereof having the formula

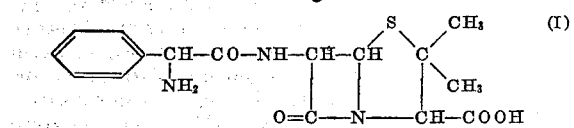

in which a diacyl penicillin ester having the formula

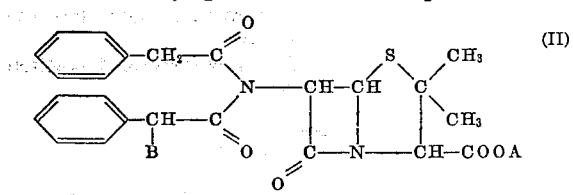

wherein B is a protected amino group and A is a protective group for the carboxyl group, is subjected to dephenylacetylation, de-esterification and amination.

This invention relates to a process for production of ampicillin having the formula

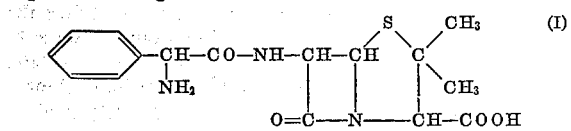

Heretofore, ampicillin has been prepared from 6-aminopenicillanic acid as a starting material (see Japanese Patent Publication Nos. Sho 36–16277, Sho 39–5642, Sho 40–1386, Sho 40–1592, Sho 40–3911, Sho 40–4064, Sho 40–11066, Sho 40–17392, Sho 40–24780, Sho 41–10697, Sho 42–11073, Sho 42–15947, Sho 43–17193 and Sho 44–12152). According to these processes, however, unstable amphoteric and water-soluble 6 - aminopenicillanic acid is isolated and purified from the fermentation liquor in which penicillin G or penicillin V is enzymatically de-acylated by microorganisms, or from the reaction mixture in which the ortho-nitropenicillin is reduced and then acidified (see Japanese Patent Publication No. Sho 42–16313), or from the aqueous reaction mixture in which the imino ether is hydrolyzed (see Japanese Pat. Pub. No. Sho 44–27391) and, due to the difficulty of the isolation or purification step, lower yield and relatively high expense have been unavoidable.

The present invention is characterized by the fact that ampicillin is prepared chemically without using 6-aminopenicillanic acid but using as a starting material inexpensive penicillin G obtainable by fermentation.

The present invention more particularly relates to a process for the production of penicillin of the formula

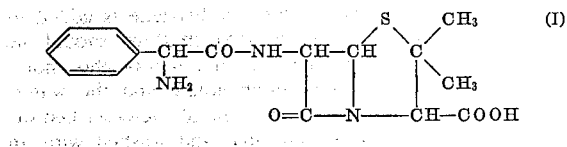

in which diacyl penicillin ester having the formula

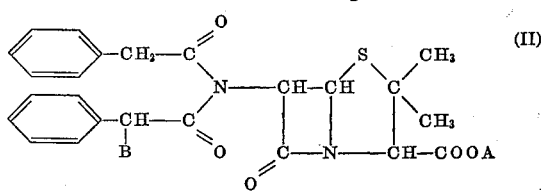

wherein A is a protective group for the carboxyl group and B is a protected amino group, is subjected to the steps of dephenylacetylation, de-esterification and amination.

An object of the present invention is to provide a novel chemical process for preparing valuable antibiotic ampicillin which is entirely different from the conventional process for preparing semi-synthetic penicillins by acylating 6-aminopencillanic acid.

Diacylpenicillin ester of formula (II) (hereinafter designated as DAPc ester (II) used in the present invention is produced by the process which comprises reacting a penicillin G ester, prepared by introducing a protective group into the carboxyl group of inexpensive penicillin G obtained by fermentation, with a chlorinating agent in the presence of a tertiary organic base to obtain an imide chloride group incorporated compound having the formula

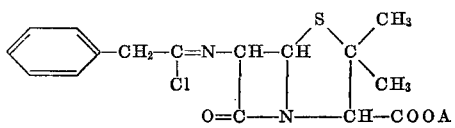

wherein A is as defined above, and then reacting the said compound with a carboxylate having the formula

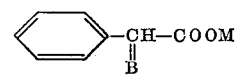

wherein M is a metal atom and B is as defined above.

The carboxyl group of pencillin G is protected so that no side reaction will be brought about in the subsequent reaction, i.e. the reaction with a chlorinating agent.

The above-mentioned introduction of a protective group is carried out by introducing into a potassium or sodium salt of penicillin G obtained by fermentation such a protective group as is used ordinarily in the synthesis of peptides. Generally, however, the protective group introduced should be eliminated in the final step and thereafter it is desirable to select a group capable of being easily eliminated without having any detrimental effect on the structure of penicillin. Favorable results are obtained by the use of such protective group as, for example, benzyl and p-nitrobenzyl groups which can be easily eliminated by catalytic reduction, or phenacyl and p-bromophenacyl groups which can be eliminated with thiophenolate.

The above-mentioned introduction of a protective group for the amino group is carried out introducing such a protective group as is used ordinarily in the synthesis of peptides. Examples of protective groups which may be introduced are carbobenzoxy, p-nitrocarbobenzoxy, carboaryloxy, p-toluenesulfonyl, trityl, benzyl, dibenzyl, benzylsulfonyl, o-nitro phenylsulfenyl, trifluoroacetyl, chloroacetyl, formyl and o-nitrophenoxyacetyl groups. Generally, however, the protective group introduced should be eliminated in the final step and therefore it is desirable to select a group capable of being easily eliminated without having any detrimental effect on the structure of penicillin.

In the present invention, the phenylacetyl group of the DAPc ester (II) is eliminated to obtain a penicillin ester of the formula

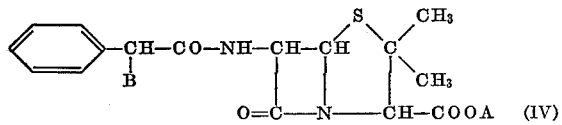

$$O=C—N—CH—COOA \quad (IV)$$

wherein A and B are as defined previously. The elimination of said group may be effected according to any of such processes as aminolysis, splitting by thiophenolate and the like.

The above aminolyzing reaction is such that the phenylacetyl group is entirely selectively cleaved by the action of a primary organic amine, secondary organic amine, ammonia or N,N-di-substituted-amino alkylamine on the DAPc ester (II). This reaction sometimes brings about, depending on the kind of aminolyzing agent, the epimerization of the hydrogen atom in the 6-position of the penicillin nucleus, or the cleavage of the beta-lactam bond of the penicillin nucleus, simultaneously with the aminolysis. However, preferable aminolysis conditions can be ensured by the selection of a suitable aminolyzing agent, reaction solvent and the like.

In the above reaction, the solvent is preferably so selected that it will not have any detrimental effect, such as epimerization or decomposition of the beta-lactam ring, on the reaction; that it will be able to solubilize the DAPc ester (II); and that it will be an organic solvent immiscible with water because, after the reaction, unreacted aminolyzing agent, e.g. a primary organic amine, is removed by washing. For example, benzene, toluene, chloroform, dichloromethane, ethyl acetate, butyl acetate, ethyl ether or isopropyl ether may be advantageously used.

As the aminolyzing agent, it is advantageous to use a compound of the formula

wherein $R_1$ and $R_2$ are alkyl of $C_{1-3}$ and $R_3$ is straight or branched chain alkylene of $C_{1-6}$ (hereinafter called diamine (III), for example 2-dimethylamino ethylamine, 2-diethlylamino ethylamine, 3-dimethylamino propylamine, 3-diethylamino propylamine and the like. Theoretically, the quantitative proportion of the diamine (III) may be equimolar to the DAPc ester (II). However, the diamine (III) is more easily removed than unreacted DAPc ester (II) and hence is ordinarily used in a molar amount one to two times that of the DAPc ester (II). The above-mentioned reaction progresses even at low temperatures and therefore no heating is necessary unless the reaction of DAPc ester (II) with a diamine (III) is undesirably slow.

With further regard to the aminolyzing agent, it is advantageous to use a primary organic amine, e.g. an aliphatic amine such as ethylamine, n-butylamine, n-propylamine, n-pentylamine, n-hexylamine, n-heptylamine, n-octylamine, caprylamine, laurylamine, myristylamine, palmitylamine. stearylamine, or the like, or an alicyclicamine such as cyclohexylamine, cyclopentylamine, benzylamine or beta-phenyl ethylamine, or the like. In the case of an aliphatic amine, the greater the number of carbon atoms, the less the danger of epimerization, and the less the decomposition of the penicillin ester of the formula (IV) (hereinafter called BPc ester (IV)). Accordingly, a straight chain aliphatic amine is advantageously used. In the case of branched chain aliphatic amines, it is better not have a side chain at the alpha-position of the carbon chain. Among these amines, straight chain higher aliphatic amines having more than 12 carbon atoms such as laurylamine, myristylamine, palmitylamine, stearylamine or the like are the most advantageously used. Theoretically, the quantitative proportion of the aminolyzing agent may be equimolar to the DAPc ester (V). However, the aminolyzing agent is more easily removed than unreacted DAPc ester (V) and hence is ordinarily used in a molar amount one to two times that of the DAPc ester (II).

The above-mentioned reaction progresses even at low temperatures and therefore no heating is necessary unless the reaction of the DAPc ester (II) with a primary organic amine is undesirably slow. In case a secondary organic amine is used, however, the reaction is slow and therefore it is sometimes necessary to heat the reaction mixture.

The dephenylacetylation reaction by thiophenolate may be effected by the reaction of DAPc ester (II) with thiophenolate to cleave the phenylacetyl group.

In the above-described reaction, when the protective group for the carboxyl group of the DAPc ester (II) is a group which is easily removed by an action of thiophenolate, for example, a phenacyl- or p-bromophenacyl-group, the dephenylacetylation and de-esterification occur simultaneously according to the amount of thiophenolate. Therefore, during dephenylacetylation, 1–1.1 molar excess of thiophenolate over DAPc ester (II) is advantageously used. More preferably, a two molar excess of thiophenolate is used, when dephenylacetylation and de-esterification occur simultaneously.

Thiophenolates used in the above-described reaction are compounds of the formula

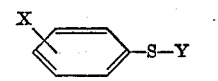

wherein X is hydrogen or halogen and Y is a metal atom, the compound being sodium thiophenolate, sodium p-chloro thiophenolate, potassium thiophenolate, potassium p-chloro thiophenolate or the like.

In the above reaction, the solvent is desirably so selected that it will not have any detrimental effect, such as epimerization or decomposition of the beta-lactam ring, on the reaction; and that it will be able to solubilize the DAPc ester (II) and thiophenolate. For example, dimethylformamide, tetrahydrofuran, acetone, ethyl acetate, methyl isobutyl ketone, benzene, ethyl acetoacetate, chloroform or dichloromethane may be advantageously used.

The above-mentioned reaction progresses even at low temperature and therefore no heating is necessary unless the reaction of DAPc ester (II) with thiophenolate is undesirably slow.

According to the above-mentioned reaction, the BPc ester (IV) or the penicillin of the formula

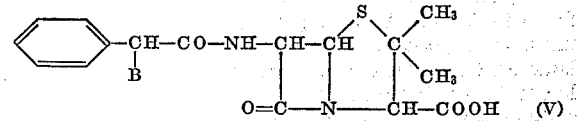

$$O=C—N—CH—COOH \quad (V)$$

wherein B has the same meaning as previously described, which is formed in the reaction mixture, will be present; and further there will simultaneously be present, as a by-product, thiohalogen substituted-phenyl ester (or phenacyl ester) of phenyl acetate, or p-bromophenacyl thio ether and unreacted thiophenolate.

When eliminating BPc ester (IV) therefrom, if an aminolyzing agent is used, and if the aliphatic amine is formed as a water soluble acid addition salt, the reaction mixture should be washed with dilute acid to remove unreacted amine. If thiophenolate is used as a dephenyl-acetylating agent, after a water-immiscible organic solvent such as ethyl acetate, butyl acetate, chloroform, dichloromethane, methyl isobutyl ketone or benzene is added to the reaction mixture, the reaction mixture should be washed with hydrochloric acid, sulfuric acid or phosphoric acid to remove unreacted thiophenolate and the water-miscible organic solvent. Further, the above-described organic solvent layer is concentrated and washed with an organic solvent which solubilizes phenyl acetic acid thiohalogen-substituted phenyl ester but does not solubilize BPc ester (IV), such as petroleum ether or n-hexane, to remove phenyl acetic acid thiohalogen-substituted phenyl ester.

The organic solvent layer obtained by the above-described washing treatment may be reacted during the next step (i.e. de-esterification and amination) as it is, or alternatively a suitable organic solvent may be added thereto. If BPc ester (IV) must be isolated, the organic solvent layer mentioned hereinabove is concentrated, and the said concentrate is charged to a column of silica gel or alumina and then eluted with a suitable solvent such as benzene-chloroform or benzene-ethylacetate to separate BPc ester (IV) readily therefrom. Further, during simultaneous dephenylacetylation and de-esterification of DAPc ester (II) with an excess of thiophenolate, BPc (V) may be isolated by the same separation and purification procedure as BPc ester (IV).

In the next step, the protective group for the amino group in BPc ester (IV) or BPc (V) is eliminated to obtain the penicillin represented by formula (I) (hereinafter said penicillin will be referred to as "PC (I)"). The said elimination is effectively carried out by the ordinary method used in the synthesis of peptides.

A protective group for the carboxyl group such as benzyl or p-nitro-benzyl can be eliminated from the BPc ester (IV) by catalytic reduction, and phenacyl or p-bromophenacyl can be eliminated by using thiophenolate.

The catalytic reduction is effected by the use of hydrogen gas and catalyzer in an inert organic solvent at ambient temperature and pressure. The obtained reaction mixture is used, after removing the catalyst, for the amination reaction directly or after substitution by a suitable organic amine. Elimination with thiophenolate is advantageously carried out in the presence of a suitable organic solvent such as dimethylformamide, tetrahydrofuran, acetone, ethylacetate, chloroform, methyl isobutyl ketone, benzene or ethyl acetoacetate. The resulting reaction mixture can be purified by the same isolation process as BPc ester (IV).

Elimination of a protective group for the amino group is effectively carried out by the usual method in the synthesis of peptides as hereinbefore indicated.

The conditions for the elimination reaction should be selected such that it will not be in danger of epimerization in the 6-position of the penicillin nucleus or in danger of destruction of the penicillin structure, and so that isolation and purification of Pc (I) from the reaction mixture after elimination will not be hindered. An object of eliminating the protective group for the carboxy- or amino-group is to produce a purified Pc (I) by application of the analogous method for peptide synthesis without any detrimental effect on the penicillin structure.

In accordance with the above-described process, Pc (I) is finally produced, and then the isolation and purification of Pc (I) from the reaction mixture containing Pc (I) can be effected by known processes for ampicillin purification.

The following examples illustrate the present invention but are not to be construed as limiting.

EXAMPLE 1

Preparation of N-(N'-trityl-D-phenylglycyl)-benzylpenicillin phenacyl ester 24.0 g. (0.053 mole) of benzylpenicillin phenacyl ester was dissolved in 120 ml. of dry benzene. To this solution was added 18.8 ml. (0.23 mole) of dry pyridine with cooling to —2–0° C. and stirring. Thereafter, a solution of 13.4 g. (0.064 mole) of $PCl_5$ in 120 ml. of dry benzene was added dropwise over a period of 30 minutes. Subsequently, the liquid was reacted for one hour while maintaining the temperature thereof at —2–4° C.

After the reaction, deposited pyridine hydrochloride was removed by filtration, and the reaction mother liquor was quickly washed with saturated sodium chloride solution, a 1–N aqueous sodium bicarbonate solution and water in this order to remove unreacted $PCl_5$ and by-product $POCl_3$. The above-mentioned benzene solution was dried for 20 minutes with anhydrous sodium sulfate, and 25.3 g. (0.06 mole) of potassium N-trityl-D-phenylglycine was added, and was stirred at 50° C. An insoluble material in the reaction mixture was filtered off, and the reaction mother liquor was then concentrated under reduced pressure. Subsequently, the concentrate was adsorbed on a column comprising 80 g. of silica gel (60–80 mesh) packed with benzene and was eluted with anhydrous benzene-ethylacetate (20:1), whereby the first eluted fraction contained the desired N-(N'-trityl-D-phenylglycyl)-benzylpenicillin phenacyl ester. This fraction was recovered and was freeze-dried to obtain 31.9 g. of a freeze-dried product, yield 72.5%.

Elementary analysis for $C_{51}H_{45}O_6N_3S$:

| | Percent | | |
|---|---|---|---|
| | C | H | N |
| Found | 75.05 | 5.62 | 5.49 |
| Calculated | 73.98 | 5.48 | 5.07 |

Infra red absorption peaks (range for 1000–1800 cm.$^{-1}$); 1600–1708, 1762 and 1793.

Nuclear Magnetic Resonance spectrum ($CDCl_3$); 1.65 (s, 6H), 3.77 (q, 2H), 4.53 (s, 1H), 4.92 (d, 1H, 0.42 c.p.s.) and 5.45 (q, 2H).

EXAMPLE 2

Preparation of alpha-N-trityl aminobenzyl penicillin phenacyl ester 16.5 g. (0.02 mole) of N-(N'-trityl phenylglycyl)-benzylpenicillin phenacyl ester was dissolved in 40 ml. of chloroform. To this solution was added dropwise 2.00 ml. (0.02 mole) of butylamine, with stirring, at room temperature (20° C.) The reaction liquid was washed with 0.5-N hydrochloric acid and saturated sodium chloride solution, in this order, to remove unreacted n-butylamine as a water-soluble hydrochloride. The reaction mother liquor was dried with anhydrous silica gel and was then concentrated under reduced pressure. The concentrate was dissolved in a small amount of benzene and was adsorbed on a column comprising 350 g. of silica gel (60–80 mesh) packed with benzene and was subjected to column chromatography using benzene-ethyl acetate (20:1) as a developing solvent. Eluted fractions were traced according to the hydroxamic acid method on a silica gel, thin layer chromatogram, and only the fractions containing alpha-N-tritylamino benzylpenicillin phenacyl ester were recovered and were freeze-dried. The thus-obtained freeze dried product was recrystallized by ethyl acetate-petroleum ether to obtain 2.2 g. of alpha-N-tritylamino benzylpenicillin as a crystal, yield 15.5%, m.p. 202–204° C.

Elementary analysis for $C_{43}H_{39}O_5N_3S$:

| | Percent | | |
|---|---|---|---|
| | C | H | N |
| Found | 72.88 | 5.68 | 5.99 |
| Calculated | 72.76 | 5.54 | 5.92 |

IR spectrum absorption band; 3350, 1785, 1720, 1685, 1590 and 1525 cm.$^{-1}$.

NMR spectrum; 1.66 (s, 2H), 1.75 (s, 3H), 3.3 (b, 1H), 4.83 (b, 1H), 4.56 (s, 1H), 5.12 (d, 1H, 4.5 c.p.s.), 5.28, 5.35, 5.42 (t, 3H), 7.3–8 (m).

EXAMPLE 3

Preparation of ampicillin 2.13 g. (0.003 mole) of alpha-N-tritylamino benzylpenicillin phenacyl ester was dissolved in 7 ml. of distilled dimethylformamide. To this solution was added 0.79 g.

(0.006 mole) of sodium thiophenolate in 3 ml. of dimethylformamide at room temperature (20° C.) with stirring. After 70 minutes, 20 ml. of ethylacetate was added, and the mixture was washed with 10% solution of acetic acid and 1 N-sodium bicarbonate solution to remove unreacted thiophenolate and dimethylformamide. After drying the reaction mixture with silica gel, 0.43 g. of sodium 2-ethyl hexanoate in 2 ml. of ethyl acetate was added, and the mixture was concentrated under reduced pressure thereafter, and petroleum ether was added thereto. The precipitated material was collected by filtration, thereafter washed and dried to yield 2.13 g. of sodium alpha-N-tritylamino benzylpenicillin.

The thus-obtained crude product was dissolved in 10 ml. of ethyl acetate. To this solution was added 0.8 ml. of trifluoroacetic acid, with stirring, at room temperature (20° C.) After 10 minutes reaction a large amount of petroleum ether was added to obtain an oily substance. To this oily substance was further added ethyl acetate to dissolve it, and the solution was neutralized with triethylamine, and an excess amount of petroleum ether was added thereto. Separated oily substance was dissolved in water, then washed with ethyl acetate. This solution was freeze dried to obtain 450 mg. of ampicillin.

That the product was identical with ampicillin standard was shown by thin layer chromatogram and bioautography ($R_f$ 0.72). The product showed an IR spectrum absorption peak of the lactam ring at 1760 cm.$^{-1}$. The potency was 340 mcg./mg.

EXAMPLE 4

Preparation of alpha-N-tritylamino benzylpenicillin phenacyl ester 20 g. (24.1 mmole) of N-(N'-trityl-D-phenylglycyl) benzylpenicillin phenacyl ester was dissolved in 50 ml. of dry benzene. To this solution was added dropwise 3.0 ml. (24.1 mmole) of 3-dimethylamino propylamine in 12 ml. of dry benzene at 5° C. with stirring for 20 minutes. Reaction was continued for two hours at 5° C. The reaction mixture was washed with saturated sodium chloride solution in 10% aqueous phosphoric acid and 1 N-sodium bicarbonate solution, in this order, to remove unreacted 3-dimethylamino propylamine as a water soluble phosphoric acid salt. After drying with anhydrous sodium sulfate, the mother liquor was concentrated under reduced pressure. 100 ml. of methanol was added thereto and the mixture was refrigerated to obtain 11 g. of crystalline alpha-N-tritylamino benzylpenicillin phenacyl ester, yield 64.3%, m.p. 202–203° C.

Elementary analysis for $C_{43}H_{39}N_3O_5S$:

|  | Percent | | |
| --- | --- | --- | --- |
|  | C | H | N |
| Found | 72.57 | 5.59 | 5.92 |
| Calculated | 72.76 | 5.54 | 5.92 |

IR spectrum (at range of 1600–1800 cm.$^{-1}$, Nujol); 1692, 1710, 1727 and 1795 cm.$^{-1}$.

EXAMPLE 75

Preparation of alpha-aminobenzyl penicillin 20 g. (28.2 mmole) of alpha-N-tritylamino benzylpenicillin phenacyl ester was dissolved in 50 ml. of distilled dimethylformamide. To this solution was added 16 g. (121 mmole) of sodium thiophenolate in 30 ml. of distilled dimethylformamide at room temperature with stirring. After 60 minutes reaction, 200 ml. of ethyl acetate was added thereto and the mixture was washed with 10% acetic acid solution and saturated sodium chloride solution to remove unreacted thiophenolate and dimethylformamide, and was thereafter dried with silica gel. To this dried solution was added 24 ml. of dichloro acetic acid at room temperature with stirring. After 15 minutes 7 g. of sodium beta-naphthalene sulfonate in 300 ml. of aqueous solution was added thereto and 200 ml. of ethyl acetate was added thereafter. After two hours reaction, the reaction mixture was refrigerated overnight and the precipitate was collected by filtration. The precipitate was washed with cold water and ethyl acetate, then dried to obtain 11 g. of alpha-amino benzylpenicillin beta-naphthalene sulfonate. Yield 75.2%. The potency was 610 mcg./mg. by microbioassay.

IR spectrum peaks for this substance at a range of 1600–1800 cm.$^{-1}$ by Nujol were 1665, 1700 and 1780 cm.$^{-1}$.

To 10 g. (18 mmole) of alpha-aminobenzyl penicillin beta-naphthalene sulfonate as hereinabove obtained was added 50 ml. of water and 2.51 ml. (18 mmole) of triethylamine at room temperature with stirring for one hour. The pH of the solution was adjusted to pH 4.5 by 1 N-HCl with ice-cooling and stirring, then the solution was refrigerated. The thus precipitated product was collected by filtration, washed with cold water and dried to obtain 4.42 g. of alpha-aminobenzyl penicillin trihydrate. Yield 61.0%, m.p. 195–215° C. (decomposed) $[\alpha]_D^{23.8} = +216$ (c. =1.0, 1N-HCl).

IR spectrum (at a range of 1600–1800 cm.$^{-1}$. Nujol); 1605, 1622, 1690 and 1780 cm.$^{-1}$.

The potency by microbioassay was 970 mcg./mg.

EXAMPLE 6

In Example 4, 2-dimethylamino ethylamine was used instead of 3-dimethylamino propylamine to obtain 9.8 g. of alpha-N-tritylamino benzyl penicillin phenacyl ester. Yield 57.8%, m.p. 203° C. This substance was treated by the same procedure as in Example 5 and then 2.19 g. alpha-aminobenzyl-penicillin trihydrate was obtained, yield 60%.

Having described our invention, we claim:

1. A process for the production of ampicillin having the formula

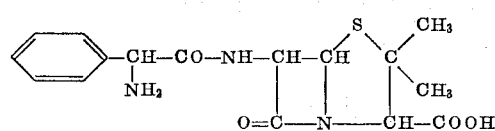

and nontoxic salts thereof, comprising contacting a diacyl penicillin ester of the formula

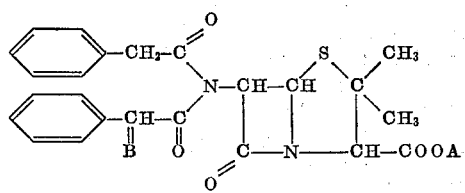

wherein A is a protective group for the carboxyl group selected from the group consisting of benzyl, p-nitrobenzyl, phenacyl and p-bromophenacyl and B is a protected amino group in which the protective group is selected from the group consisting of carbobenzoxy, p-nitrocarbobenzoxy, p-toluenesulfonyl, trityl, benzyl, dibenzyl, benzylsulfonyl, o-nitrophenylsulfenyl, trifluoroacetyl, chloroacetyl, formyl and o-nitrophenoxyacetyl groups, with a member selected from the group consisting of 2-dimethylamino ethylamine, 2-diethylamino ethylamine, 3-dimethylamino propylamine, 3-diethylamino propylamine, sodium thiophenolate, sodium p-chloro thiophenolate, potassium thiophenolate and potassium p-choloro thiophenolate at a temperature of 0–30° C. thereby to remove the phenylacetyl group; contacting with a member selected from the group consisting of sodium thiophenolate, sodium p-chloro thiophenolate, potassium thiophenolate and potassium p-chloro thiophenolate at a temperature of 0–30° C. thereby to remove said protective group for said carboxyl group and thereafter contacting with a member selected from the group consisting of dichloro acetic acid and trifluoro acetic acid at a temperature of 0–30° C. thereby to remove said protective group for said protected amino group.

References Cited
UNITED STATES PATENTS

| | | | |
|---|---|---|---|
| 3,472,841 | 10/1969 | Johnson et al. | 260—239.1 |
| 3,372,158 | 3/1968 | Hatt et al. | 260—239.1 |
| 3,553,202 | 1/1971 | Hatt et al. | 260—239.1 |

NICHOLAS S. RIZZO, Primary Examiner

U.S. Cl. X.R.

424—271